(12) United States Patent
Isono

(10) Patent No.: US 7,549,809 B2
(45) Date of Patent: Jun. 23, 2009

(54) IMAGE-TAKING LENS SYSTEM AND DIGITAL APPARATUS USING THE SAME

(75) Inventor: Masashi Isono, Hoi-gun (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 564 days.

(21) Appl. No.: 11/317,707

(22) Filed: Dec. 23, 2005

(65) Prior Publication Data

US 2006/0140622 A1 Jun. 29, 2006

(30) Foreign Application Priority Data

Dec. 27, 2004 (JP) ............................. 2004-375491

(51) Int. Cl.
*G03B 17/00* (2006.01)
*G02B 15/14* (2006.01)
*G02B 9/34* (2006.01)

(52) U.S. Cl. ....................... 396/439; 359/686; 359/715; 359/771

(58) Field of Classification Search ................. 396/439; 359/686, 687, 715, 747, 771, 773, 774
See application file for complete search history.

(56) References Cited

U.S. PATENT DOCUMENTS

| 6,747,810 B2 | 6/2004 | Sato | ........................... 359/715 |
| 2004/0218285 A1* | 11/2004 | Amanai | ...................... 359/773 |
| 2006/0126193 A1* | 6/2006 | Noda | ......................... 359/785 |

FOREIGN PATENT DOCUMENTS

| JP | 2002-228922 A | 8/2002 |
| JP | 2002-365529 A | 12/2002 |
| JP | 2002-365530 A | 12/2002 |
| JP | 2002-365531 A | 12/2002 |

* cited by examiner

*Primary Examiner*—Rochelle-Ann J Blackman
(74) *Attorney, Agent, or Firm*—Sidley Austin LLP

(57) ABSTRACT

An aperture stop, a first lens having a positive power, a second lens having a negative power, a third lens having a positive power, and a fourth lens whose concave face is directed toward the image surface side and having a meniscus shape are disposed in order from the object side. The second and third lenses are cemented to each other. Further, focal length "f" of the entire system and total focal length "f23" of the second and third lenses satisfy the following conditional expression.

$$|f/f23|<0.4$$

8 Claims, 9 Drawing Sheets

SPHERICAL ABERRATION
SINE CONDITION

ASTIGMATISM

DISTORTION %

IMAGE-TAKING LENS SYSTEM AND DIGITAL APPARATUS USING THE SAME

The present application claims priority to Japanese Patent Application No. 2004-375491 filed on Dec. 27, 2004, the entire content of which is hereby incorporated by reference.

BACKGROUND OF THE INVENTION

1. Field of the Invention

The present invention relates to a small-sized image-taking lens system and, more particularly, to a high-performance compact image-taking lens system for a solid state imaging device, suitable for a digital input apparatus (such as a digital still camera or a digital video camera).

2. Description of the Related Art

In recent years, as personal computers and the like are being spread, a digital still camera, a digital video camera, and the like (hereinbelow, generically called digital cameras) capable of easily capturing image information into a digital device are being spread also among individual users. It is expected that such digital cameras will be spread more and more as image information input devices also in future.

The size of a solid state imaging device such as a CCD (Charge Coupled Device) mounted on a digital camera is also being reduced and, accordingly, a digital camera is also being requested to realize further reduction in size. Consequently, the image-taking lens system occupying large volume in a digital input device is also strongly demanded to be more compact. In miniaturization of the image-taking lens system, the easiest method is to reduce the size of a solid state imaging device. For this purpose, the size of a light receiving element has to be reduced, it becomes more difficult to manufacture the solid state imaging device, and the performance demanded for the image-taking lens system becomes higher.

On the other hand, when the size of the solid state imaging device is unchanged but the size of the image-taking lens system is reduced, the exit pupil position becomes inevitably closer to the image surface. When the exit pupil position becomes closer to the image surface, an off-axis light flux emitted from the image-taking lens system is incident obliquely on the image surface, the light collecting performance of a micro lens is not sufficiently exerted, and a problem occurs such that the brightness in the center part of an image and that in the peripheral part of the image become largely different from each other. If the exit pupil position of the image-taking lens system is disposed far from the image surface in order to solve the problem, increase in the size of the whole image-taking lens system is inevitable. In addition, due to increase in density of solid state imaging elements in recent years, the performance required of the image-taking lens system is also being increased.

Lens systems each comprised of four lenses for solid state imaging devices to address such demands are disclosed in Japanese Patent Laid-open Nos. 2002-228922, 2002-365529, 2002-365530, and 2002-365531, and U.S. Pat. No. 6,747,810.

In the configurations disclosed in Japanese Patent Laid-open Nos. 2002-228922, 2002-365529, 2002-365530, and 2002-365531, each of the four lenses is a single lens, so that there are many factors of causing a manufacture error accompanying a work of assembling the lenses, and degradation in the performance tends to be large.

In the configuration disclosed in U.S. Pat. No. 6,747,810, the second and third lenses are cemented to each other to obtain a three-group configuration, thereby reducing the manufacture error factors. However, since the aperture stop is disposed on the image surface side of the first lens, it is necessary to form the optical system largely to set the exit pupil position far from the image surface.

SUMMARY OF THE INVENTION

A main object of the present invention is to provide a compact image-taking lens system for a solid state imaging device while minimizing degradation in performance caused by a manufacture error.

To achieve the object and the other objects, according to an aspect of the present invention, an image-taking lens system for forming an image on a solid state imaging element is provided, constructed by four lenses in three groups in which a first lens having a positive power, a cemented lens of a second lens having a negative power and a third lens having a positive power, and a fourth lens whose concave face is directed toward the image surface side and having a meniscus shape are disposed in order from the object side, and satisfying the following conditional expression.

$$|f/f23|<0.4$$

where f: focal length of the entire system f23: total focal length of the second and third lenses The invention itself, together with further objects and attendant advantages, will best be understood by reference to the following detailed description.

BRIEF DESCRIPTION OF THE DRAWINGS

In the following description, like parts are designated by like reference numbers throughout the several drawings.

DETAILED DESCRIPTION OF THE PREFERRED EMBODIMENTS

Embodiments of the present invention will be described hereinbelow with reference to the drawings. In the following embodiments, "power" denotes an amount defined by the inverse number of a focal length.

Figure 1:
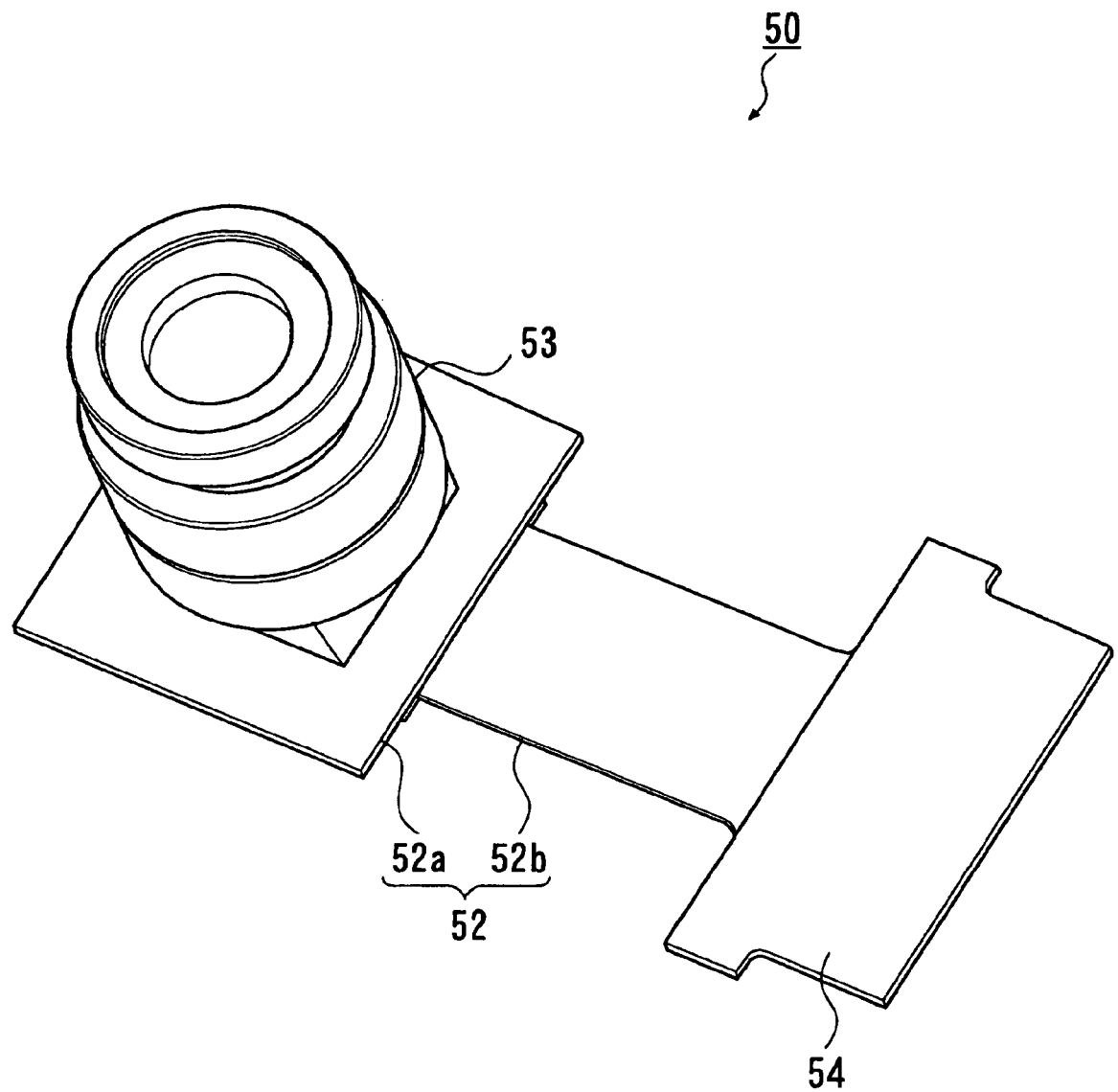
FIG. 1 is a perspective view of an image-taking device.

FIG. 1 is a perspective view of an image-taking device 50 to which the present invention is applied. The image-taking device 50 is obtained by integrally forming a lens unit 53, a solid state imaging device (such as CCD, CMOS, or the like, not shown) as an image pickup device, and a substrate 52 holding the lens unit 53 and the solid state imaging device and having an external connection terminal 54 for transmitting/receiving electric signals.

The substrate 52 has a supporting flat plate 52a for supporting the solid-state imaging device and the lens unit 53 on one of its flat surfaces, and a flexible substrate 52b whose one end is connected to the rear face (the face on the side opposite to the solid state imaging device) of the supporting flat plate 52a.

The flexible substrate 52b has one end connected to the supporting flat plate 52a as described above, connects the supporting flat plate 52a to an external circuit (for example, a control circuit of a high-order apparatus on which the image pickup device is mounted) via the external output terminal 54 provided at the other end, receives supply of a voltage and a clock signal for driving the solid state imaging device from the external circuit, and enables a digital YUV signal to be output to the external circuit. Further, an intermediate part in the longitudinal direction of the flexible substrate 52b has flexibility and deformability and, by deformation, flexibility is given to the direction and layout of the external output terminal with respect to the supporting flat plate 52a.

The lens unit 53 is fixed by adhesion on the flat surface on which the solid state imaging device is provided in the supporting flat plate 52a of the substrate 52 in a state where the lens unit 53 stores therein the solid state imaging device. The image-taking lens system is held in the lens unit 53.

Figure 2A:
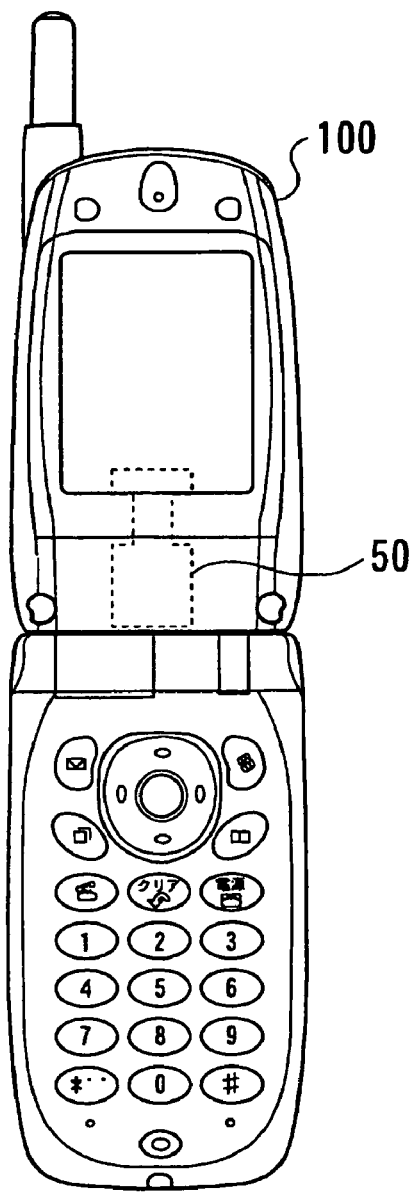
FIG. 2A is a front view of a cellular phone having therein the image-taking device.
Figure 2B:
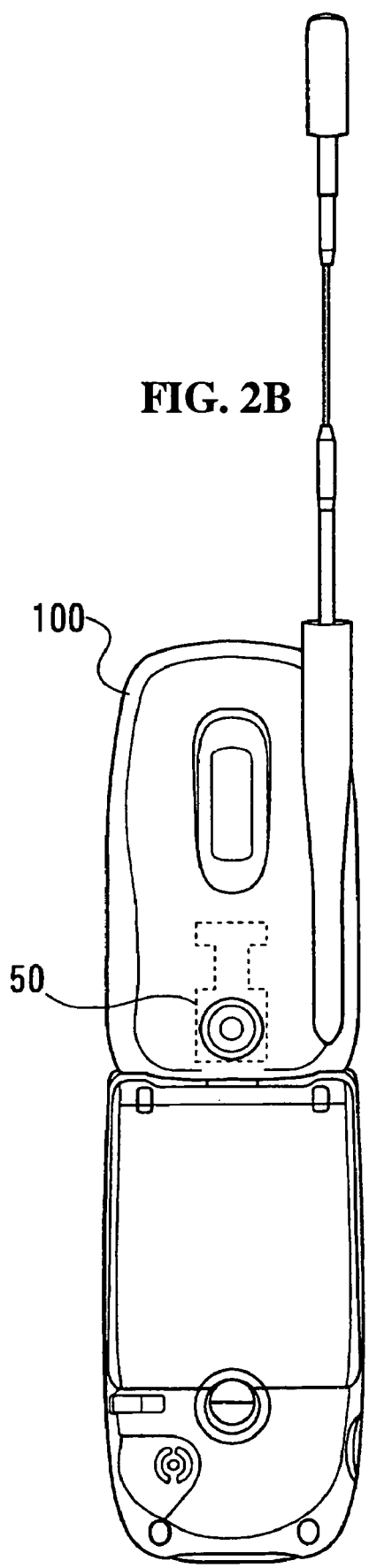
FIG. 2B is a rear view of the cellular phone having therein the image-taking device.
Figure 3:
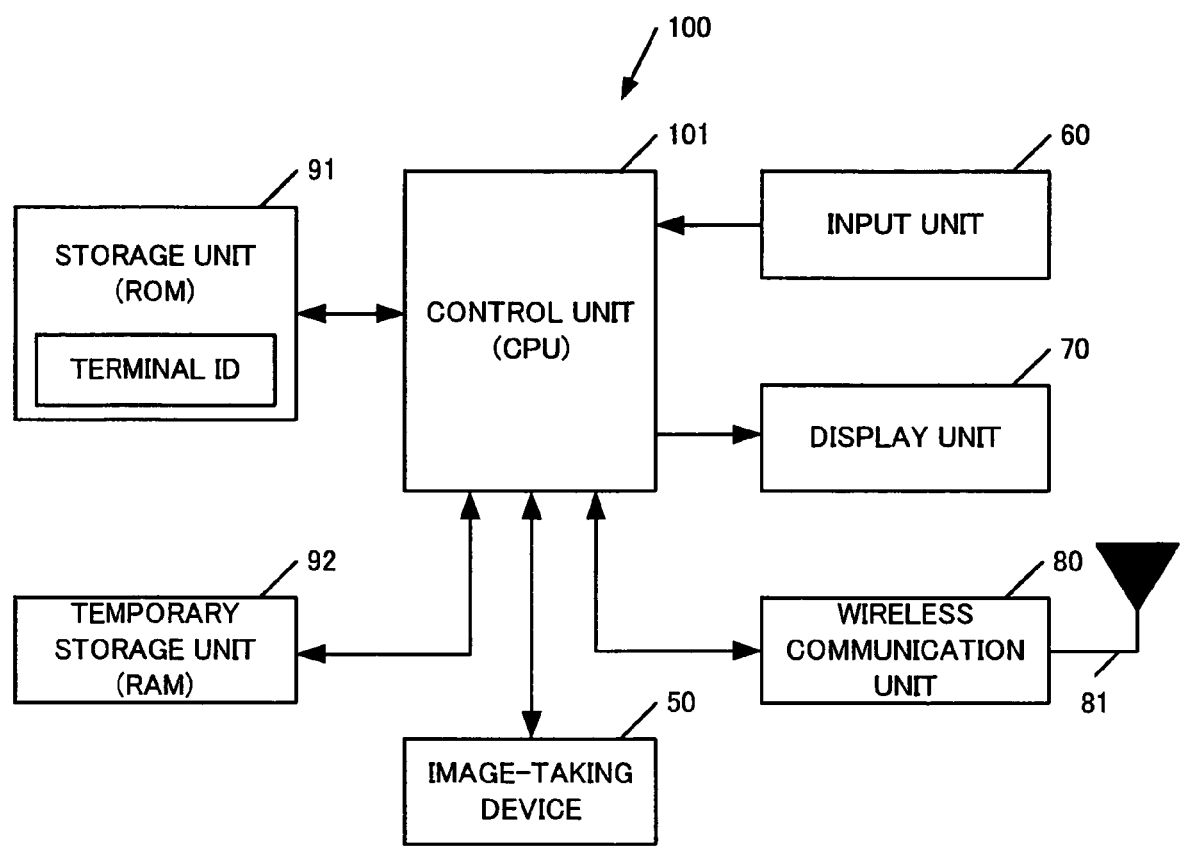
FIG. 3 is a control block diagram of the cellular phone.

The use mode of the image-taking device 50 will now be described. FIG. 2 shows a state where the image-taking device 50 is provided in a cellular phone 100 as a portable terminal. FIG. 3 is a control block diagram of the cellular phone 100.

For example, an object-side end face of the lens unit 53 in the image-taking lens system is provided in the rear face (when the liquid crystal display side is the front face) of the cellular phone 100, and the image-taking device 50 is disposed in a position below the liquid crystal display.

The external connection terminal 54 of the image-taking device 50 is connected to a control unit 101 in the cellular phone 100 and outputs image signals such as a luminance signal and a color difference signal to the control unit 101 side.

The cellular phone 100 has, as shown in FIG. 3, a control unit (CPU) 101 for controlling the components in a centralized manner and executing a program in accordance with each process, an input unit 60 for entering a number and the like by using keys, a display unit 70 displaying not only predetermined data but also a video image captured, a wireless communication unit 80 for realizing various information communications to be performed with external servers, a storage unit (ROM) 91 storing a system program of the cellular phone 100, various processing programs, and various necessary data such as a terminal ID, and a temporary storage unit (RAM) 92 temporarily storing various programs and data executed by the control unit 101, process data, and data captured by the image-taking device 50.

An image signal input from the image-taking device 50 is stored in the storage unit 92, displayed on the display unit 70, or transmitted as video information to the outside via the wireless communication unit 80 by a control system of the cellular phone 100.

Figure 4:
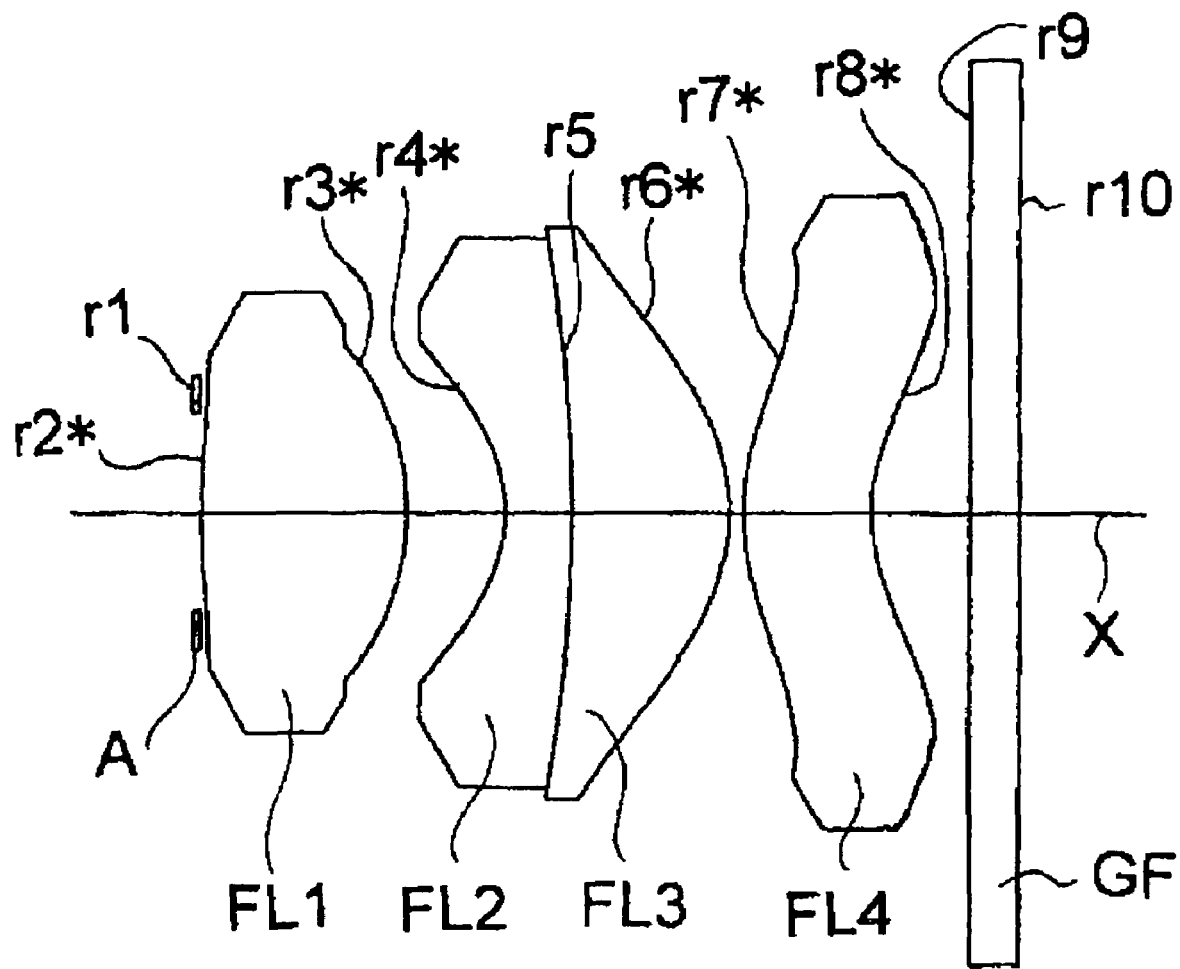
FIG. 4 is a lens configuration diagram of an image-taking lens system of a first embodiment (Example 1).
Figure 5:
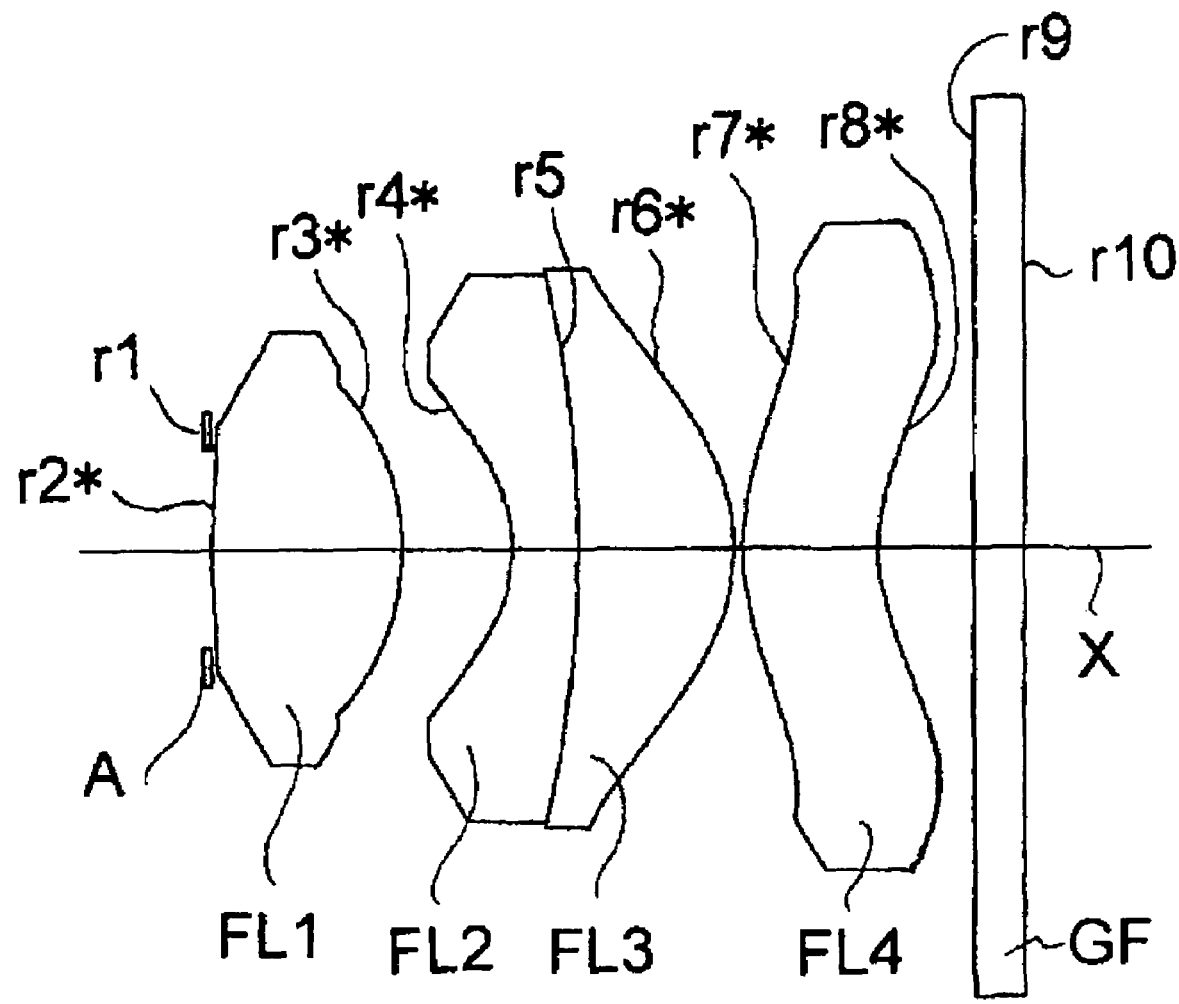
FIG. 5 is a lens configuration diagram of an image-taking lens system of a second embodiment (Example 2).
Figure 6:
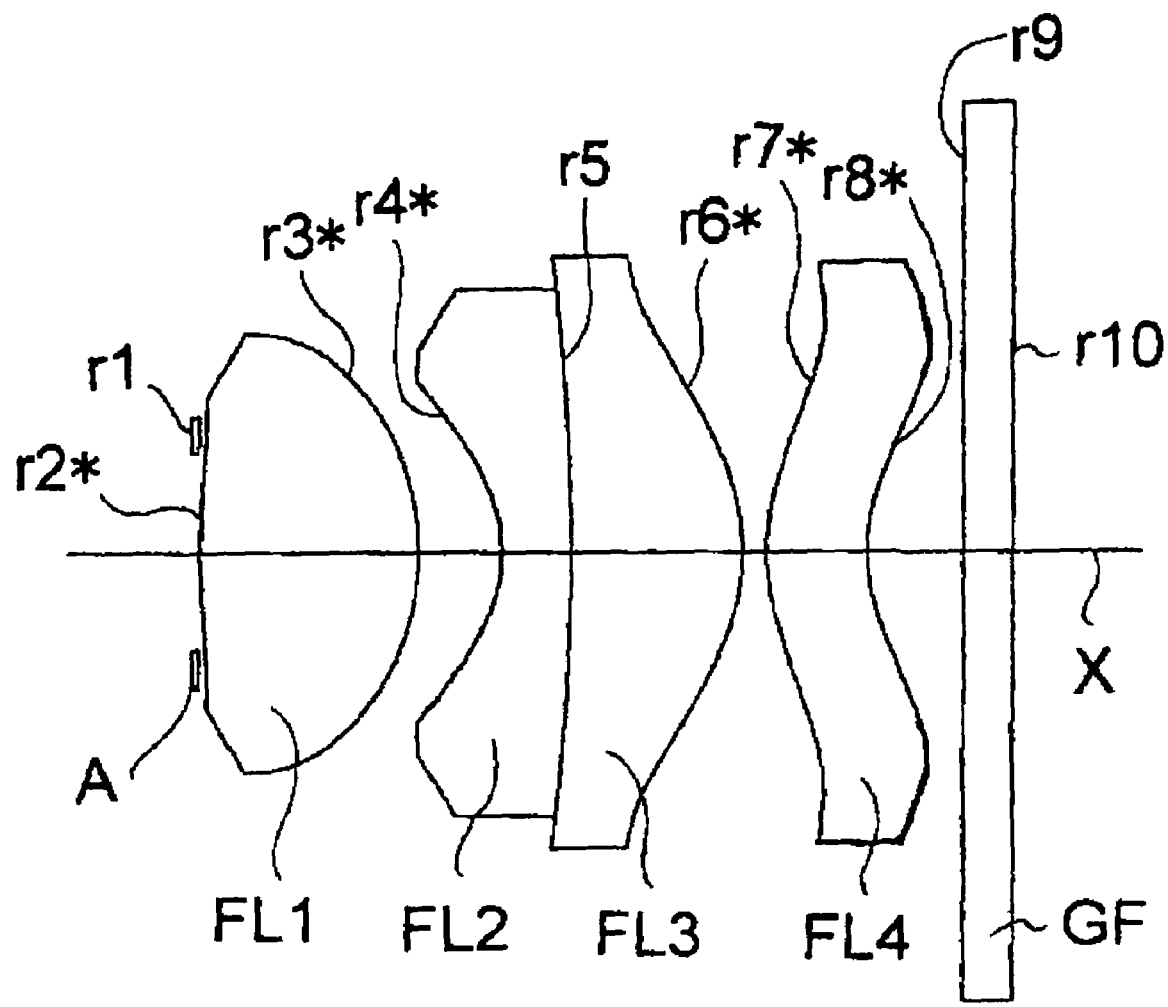
FIG. 6 is a lens configuration diagram of an image-taking lens system of a third embodiment (Example 3).

FIGS. 4 to 6 are optical cross sections showing the lens configurations of the first to third embodiments, respectively. Each of the image-taking lens systems of the embodiments has, in order from the object side, an aperture stop A, a first lens FL1 having a biconvex shape and a positive power, a second lens FL2 having a negative power and whose concave surface is directed to the object side, a third lens FL3 having a positive power and whose convex surface is directed to the image surface side, a fourth lens FL4 having a meniscus shape and whose concave surface is directed to the image surface side, and a glass filter GF. The lenses FL2 and FL3 are a cemented lens. The optical axis is expressed as X.

Conditional expressions to be satisfied by the image-taking lens system of each of the embodiments, that is, conditional expressions to be desirably satisfied by image-taking lens systems of types like those of the foregoing embodiments will be described. It is not necessary to simultaneously satisfy all of the following conditional expressions. When each of the conditional expressions is satisfied singularly in accordance with an optical configuration, a corresponding action/effect can be achieved. Obviously, it is more preferable to satisfy a plurality of conditional expressions from the viewpoints of optical performance, miniaturization, manufacturing, assembly, and the like.

Desirably, the image-taking lens system of each of the foregoing embodiments satisfies the following conditional expression (1).

$$|f/f23|<0.4 \quad (1)$$

where f: focal length of the entire system f23: total focal length of the second and third lenses The conditional expression (1) specifies a conditional range for suppressing performance degradation caused by a manufacture error at the time of assembling the cemented lens of the second and third lenses. When the image-taking lens system exceeds the range of the conditional expression (1), the performance degradation caused by a manufacture error at the time of assembling the lenses increases.

It is further desirable to satisfy the following conditional expression (1A).

$$|f/f23|<0.3 \quad (1A)$$

Desirably, the image-taking lens system of the embodiments satisfies the following conditional expression (2).

$$|f/f4|<0.15 \quad (2)$$

where f: focal length of the entire system f4: focal length of the fourth lens

The conditional expression (2) specifies a conditional range for obtaining mainly balance between the overall length and an aberration with respect to the fourth lens. When the image-taking lens system exceeds the range of the conditional expression (2), it is advantageous to shorten the overall length but degradation in aberration, particularly, degradation in distortion and curvature of field becomes considerable.

Further, it is desirable to satisfy the following conditional expression (2A).

$$|f/f4|<0.13 \quad (2A)$$

Desirably, the image-taking lens system of each of the foregoing embodiments satisfies the following conditional expression (3).

$$0.1<d7/f<0.4 \quad (3)$$

where f: focal length of the entire system d7: thickness on the axis of the fourth lens The conditional expression (3) specifies a conditional range for mainly obtaining balance between the exit pupil position and a distortion with respect to the thickness on the axis of the fourth lens. When the image-taking lens system exceeds the upper limit of the conditional expression (3), it is advantageous for the exit pupil position but degradation in distortion becomes considerable. On the contrary, when the image-taking lens system exceeds the lower limit of the conditional expression (3), it is advantageous for the distortion but becomes disadvantageous for the exit pupil position. It is, therefore, not preferable for the image-taking lens system for a solid state imaging device.

Further, it is preferable that the following conditional expression (3A) is satisfied.

$$0.14 < d7/f < 0.3 \tag{3A}$$

Preferably, the image-taking lens system of each of the foregoing embodiments satisfies the following conditional expression (4).

$$0.1 < (r2+r3)/(r2-r3) < 0.9 \tag{4}$$

where r2: radius of curvature on the object side surface of the first lens r3: radius of curvature on the image side surface of the first lens The conditional expression (4) specifies a conditional range for mainly obtaining balance between the overall length and the exit pupil position with respect to the first lens. When the image-taking lens system exceeds the upper limit of the conditional expression (4), it is advantageous for the exit pupil position but the optical overall length increases. On the contrary, when the image-taking lens system exceeds the lower limit of the conditional expression (4), it is advantageous for miniaturization but is disadvantageous for the exit pupil position. It is, therefore, not preferable for the image-taking lens system for a solid state imaging device.

Further, it is preferable that the following conditional expression (4A) is satisfied.

$$0.3 < (r2+r3)/(r2-r3) < 0.7 \tag{4A}$$

Preferably, at least the image surface side of the fourth lens of the image-taking lens system of the invention is constructed by an aspheric surface. The configuration is very effective at reducing the size of the optical system and making the exit pupil position far. Concretely, by making the image surface of the fourth lens aspheric, the portion around the axis has a negative power and it contributes to miniaturization of the optical system. The negative power weakens toward the periphery. Further, by having a positive power, it contributes to make the exit pupil position far.

The image-taking lens system as an embodiment of the present invention will be described below more concretely by using construction data, aberration diagrams, and the like. Examples 1 to 3 to be mentioned here correspond to the foregoing first to third embodiments, respectively, and lens configuration diagrams (FIGS. 4 to 6) showing the first to third embodiments show the lens configurations of Examples 1 to 3, respectively. In construction data of the embodiments, ri (i=1, 2, 3, ...) indicates the radius of curvature (mm) of the i-th surface from the object side, di (i=1, 2, 3, ...) indicates the i-th interval (mm) on the axis from the object side, and Ni (i=1, 2, and 3) and vi (i=1, 2, and 3) indicate the refractive index (Nd) and Abbe number (vd) for the d line of the i-th optical element from the object side. The focal length ("f" in mm) and the F number (FNO) of the entire system are also shown together with the other data.

Further, the surface whose radius ri of curvature is with the mark * is a refraction optical surface having an aspheric surface shape and is defined by the following expression (AS) indicative of an aspheric surface shape. Aspheric surface data of the embodiments is shown together with the other data.

$$X(H) = \frac{C \cdot H^2}{1 + \sqrt{1 - \varepsilon \cdot C^2 \cdot H^2}} + \sum (A_i \cdot H^i) \tag{AS}$$

where H: height in the direction perpendicular to the optical axis

X(H): displacement amount in the optical axis direction at the position of height H (when the apex of the surface is used as a reference)

C: paraxial curvature $\varepsilon$: quadric surface parameter $A_i$: the i-th aspheric surface coefficient $H^i$: the i-th power of H

EXAMPLE 1 f = 5.8 mm (focal length in the entire system)
FNO = 2.8 (F number)

| Radius of Curvature | Axial Distance | Refractive Index(Nd) | Abbe Number(vd) |
|---|---|---|---|
| r1 = ∞ (Stop) | | | |
| | d1 = 0.050 | | |
| r2* = 7.962 | | | |
| | d2 = 2.140 | N1 = 1.51680 | v1 = 64.20 |
| r3* = −2.876 | | | |
| | d3 = 1.003 | | |
| r4* = −1.615 | | | |
| | d4 = 0.700 | N2 = 1.58340 | v2 = 30.23 |
| r5 = −17.223 | | | |
| | d5 = 1.650 | N3 = 1.53048 | v3 = 55.72 |
| r6* = −2.271 | | | |
| | d6 = 0.147 | | |
| r7* = 2.592 | | | |
| | d7 = 1.310 | N4 = 1.53048 | v4 = 55.72 |
| r8* = 1.985 | | | |
| | d8 = 1.000 | | |
| r9 = ∞ | | | |
| | d9 = 0.500 | N5 = 1.51680 | v5 = 64.20 |
| r10 = ∞ | | | |

[Aspheric surface coefficient of the second surface (r2)]

$\varepsilon = 0.16485 \times 10$
$A4 = -0.86696 \times 10^{-2}$
$A6 = -0.17530 \times 10^{-2}$
$A8 = -0.47532 \times 10^{-3}$

[Aspheric surface coefficient of the third surface (r3)]

$\varepsilon = 0.15961 \times 10$
$A4 = 0.10490 \times 10^{-2}$
$A6 = -0.53218 \times 10^{-3}$
$A8 = 0.14869 \times 10^{-3}$

[Aspheric surface coefficient of the fourth surface (r4)]

$\varepsilon = 0.53056$
$A4 = 0.31433 \times 10^{-1}$
$A6 = -0.24853 \times 10^{-2}$
$A8 = 0.12762 \times 10^{-2}$

[Aspheric surface coefficient of the sixth surface (r6)]

$\varepsilon = -0.13224 \times 10$
$A4 = -0.18417 \times 10^{-1}$
$A6 = 0.43578 \times 10^{-2}$
$A8 = -0.57538 \times 10^{-3}$
$A10 = 0.51000 \times 10^{-4}$
$A12 = -0.20431 \times 10^{-5}$

[Aspheric surface coefficient of the seventh surface (r7)]

$\varepsilon = -0.62841$
$A4 = -0.19277 \times 10^{-1}$
$A6 = 0.13051 \times 10^{-2}$
$A8 = -0.68297 \times 10^{-4}$
$A10 = 0.48217 \times 10^{-5}$
$A12 = -0.64744 \times 10^{-6}$

[Aspheric surface coefficient of the eighth surface (r8)]

$\varepsilon = -0.10000 \times 10$
$A4 = -0.21057 \times 10^{-1}$
$A6 = 0.18409 \times 10^{-2}$
$A8 = -0.89877 \times 10^{-4}$ -continued f = 5.8 mm (focal length in the entire system)
FNO = 2.8 (F number)

A10 = −0.65085 × 10⁻⁶
A12 = 0.10551 × 10⁻⁶

EXAMPLE 2 f = 5.8 mm (focal length in the entire system)
FNO = 2.8 (F number)

| Radius of Curvature | Axial Distance | Refractive Index(Nd) | Abbe Number(νd) |
|---|---|---|---|
| r1 = ∞ (Stop) | | | |
| | d1 = 0.050 | | |
| r2* = 8.629 | | | |
| | d2 = 1.992 | N1 = 1.48749 | ν1 = 70.44 |
| r3* = −2.769 | | | |
| | d3 = 1.132 | | |
| r4* = −1.614 | | | |
| | d4 = 0.700 | N2 = 1.58340 | ν2 = 30.23 |
| r5 = −12.444 | | | |
| | d5 = 1.617 | N3 = 1.53048 | ν3 = 55.72 |
| r6* = −2.221 | | | |
| | d6 = 0.100 | | |
| r7* = 2.699 | | | |
| | d7 = 1.408 | N4 = 1.53048 | ν4 = 55.72 |
| r8* = 2.062 | | | |
| | d8 = 1.000 | | |
| r9 = ∞ | | | |
| | d9 = 0.500 | N5 = 1.51680 | ν5 = 64.20 |
| r10 = ∞ | | | |

[Aspheric surface coefficient of the second surface (r2)]

$\epsilon$ = −0.39069 × 10
A4 = −0.95738 × 10⁻²
A6 = −0.21713 × 10⁻²
A8 = −0.58771 × 10⁻³
[Aspheric surface coefficient of the third surface (r3)]

$\epsilon$ = 0.15794 × 10
A4 = 0.66482 × 10⁻³
A6 = −0.38456 × 10⁻³
A8 = 0.15379 × 10⁻³
[Aspheric surface coefficient of the fourth surface (r4)]

$\epsilon$ = 0.53844
A4 = 0.31533 × 10⁻¹
A6 = −0.17201 × 10⁻²
A8 = 0.12955 × 10⁻²
[Aspheric surface coefficient of the sixth surface (r6)]

$\epsilon$ = −0.12079 × 10
A4 = −0.18636 × 10⁻¹
A6 = 0.43948 × 10⁻²
A8 = −0.56407 × 10⁻³
A10 = 0.52584 × 10⁻⁴
A12 = −0.22120 × 10⁻⁵
[Aspheric surface coefficient of the seventh surface (r7)]

$\epsilon$ = −0.57638
A4 = −0.18925 × 10⁻¹
A6 = 0.14664 × 10⁻²
A8 = −0.66127 × 10⁻⁴
A10 = 0.10534 × 10⁻⁵
A12 = −0.24646 × 10⁻⁶
[Aspheric surface coefficient of the eighth surface (r8)]

$\epsilon$ = −0.10000 × 10
A4 = −0.21210 × 10⁻¹
A6 = 0.20680 × 10⁻²
A8 = −0.11929 × 10⁻³
A10 = 0.15919 × 10⁻⁵
A12 = 0.41411 × 10⁻⁷

EXAMPLE 3 f = 5.8 mm (focal length in the entire system)
FNO = 2.8 (F number)

| Radius of Curvature | Axial Distance | Refractive Index(Nd) | Abbe Number(νd) |
|---|---|---|---|
| r1 = ∞ (Stop) | | | |
| | d1 = 0.050 | | |
| r2* = 8.763 | | | |
| | d2 = 2.275 | N1 = 1.58913 | ν1 = 61.25 |
| r3* = −2.860 | | | |
| | d3 = 0.841 | | |
| r4* = −1.618 | | | |
| | d4 = 0.707 | N2 = 1.58340 | ν2 = 30.23 |
| r5 = −25.487 | | | |
| | d5 = 1.804 | N3 = 1.53048 | ν3 = 55.72 |
| r6* = −2.436 | | | |
| | d6 = 0.255 | | |
| r7* = 2.357 | | | |
| | d7 = 1.045 | N4 = 1.53048 | ν4 = 55.72 |
| r8* = 1.842 | | | |
| | d8 = 1.000 | | |
| r9 = ∞ | | | |
| | d9 = 0.500 | N5 = 1.51680 | ν5 = 64.20 |
| r10 = ∞ | | | |

[Aspheric surface coefficient of the second surface (r2)]

$\epsilon$ = 0.44022 × 10
A4 = −0.84994 × 10⁻²
A6 = −0.17163 × 10⁻²
A8 = −0.45142 × 10⁻³
[Aspheric surface coefficient of the third surface (r3)]

$\epsilon$ = 0.15181 × 10
A4 = 0.13250 × 10⁻²
A6 = −0.64911 × 10⁻³
A8 = 0.24570 × 10⁻³
[Aspheric surface coefficient of the fourth surface (r4)]

$\epsilon$ = 0.54292
A4 = 0.32817 × 10⁻¹
A6 = −0.20504 × 10⁻²
A8 = 0.13072 × 10⁻²
[Aspheric surface coefficient of the sixth surface (r6)]

$\epsilon$ = −0.19517 × 10
A4 = −0.16820 × 10⁻¹
A6 = 0.44820 × 10⁻²
A8 = −0.57865 × 10⁻³
A10 = 0.49550 × 10⁻⁴
A12 = −0.18579 × 10⁻⁵
[Aspheric surface coefficient of the seventh surface (r7)]

$\epsilon$ = −0.52469
A4 = −0.20378 × 10⁻¹
A6 = 0.12498 × 10⁻²
A8 = −0.60592 × 10⁻⁴
A10 = 0.58964 × 10⁻⁵
A12 = −0.77882 × 10⁻⁶
[Aspheric surface coefficient of the eighth surface (r8)]

$\epsilon$ = −0.10000 × 10
A4 = −0.20906 × 10⁻¹
A6 = 0.17224 × 10⁻²
A8 = −0.82559 × 10⁻⁴
A10 = −0.80884 × 10⁻⁶
A12 = 0.81860 × 10⁻⁷

Values corresponding to the parameters specified by the conditional expressions (1), (2), (3), and (4) in the foregoing embodiments are shown below.

| | Conditional Expression | | | |
|---|---|---|---|---|
| | (1) | (2) | (3) | (4) |
| Example 1 | 0.02 | 0.09 | 0.23 | 0.47 |
| Example 2 | 0.06 | 0.08 | 0.24 | 0.51 |
| Example 3 | 0.08 | 0.11 | 0.18 | 0.51 |

Figure 7A:
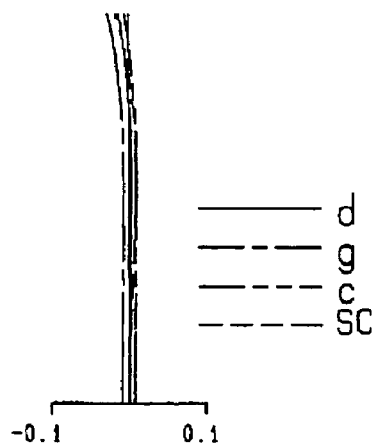
FIGS. 7A to 7C are diagrams showing aberrations of the image-taking lens system of Example 1.
Figure 7B:
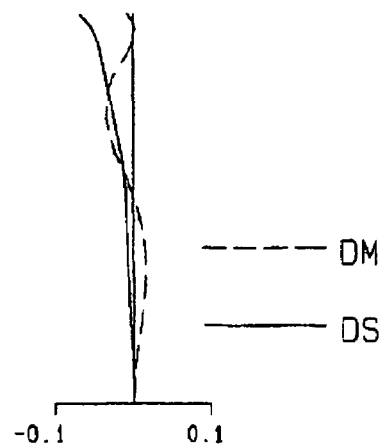
Figure 7C:
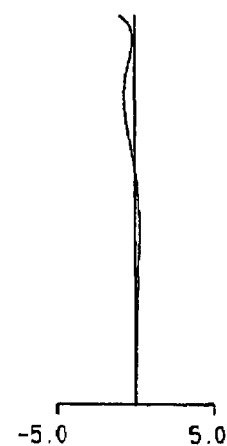
Figure 8A:
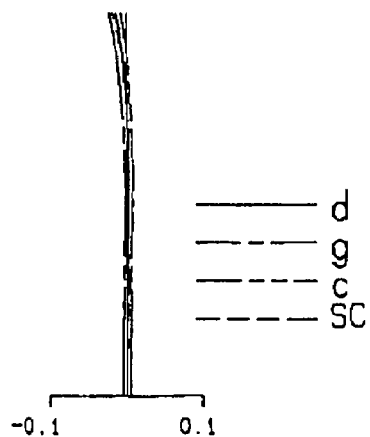
FIGS. 8A to 8C are diagrams showing aberrations of the image-taking lens system of Example 2.
Figure 8B:
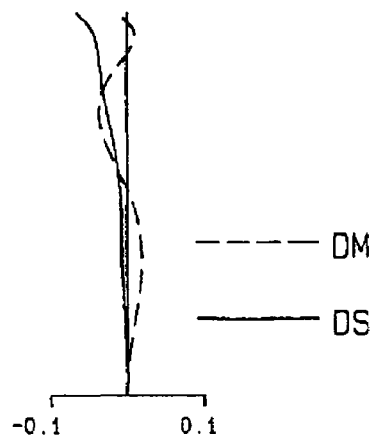
Figure 8C:
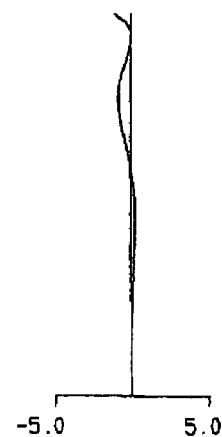
Figure 9A:
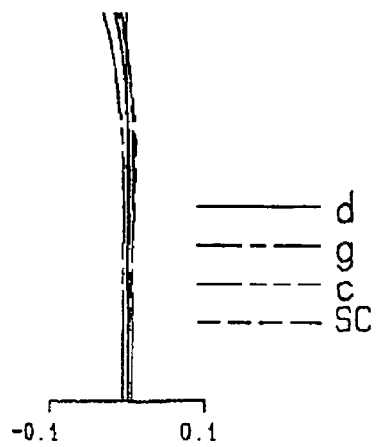
FIGS. 9A to 9C are diagrams showing aberrations of the image-taking lens system of Example 3.
Figure 9B:
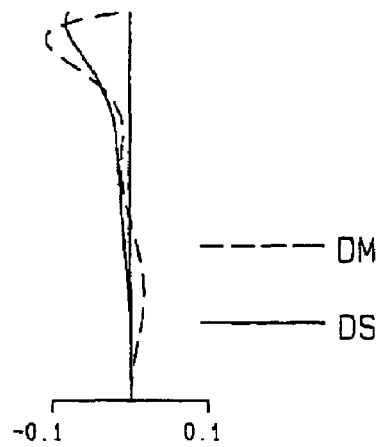
Figure 9C:
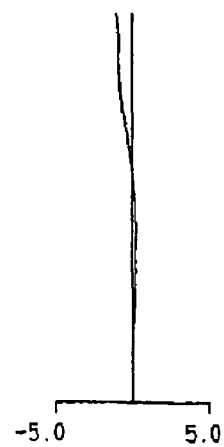

FIGS. 7A to 7C to FIGS. 9A to 9C are aberration diagrams corresponding to Examples 1 to 3, respectively. The aberration diagrams are a spherical surface aberration diagram, an astigmatism diagram, and a distortion diagram in order from the left (FNO: F number and Y': the maximum image height (mm)). In FIGS. 7A, 8A, and 9A, the solid line "d", the alternate long and short dash line "g", and the alternate long and two short dashes line "c" show spherical aberration amounts (mm) with respect to the d-line, the g-line, and the c-line, respectively. The broken line SC shows a sine condition unsatisfactory amount (mm). In FIGS. 7B, 8B, and 9B, the broken line DM indicates astigmatism (mm) with respect to the d-line in a meridional plane, and the solid line DS indicates astigmatism (mm) with respect to the d-line in a sagittal plane. In FIGS. 7C, 8C, and 9C, the solid line indicates distortion (%) with respect to the d-line. The vertical axis in the spherical aberration diagram expresses the F number of a light beam, and the vertical axis in each of the astigmatism diagram and the distortion diagram expresses the maximum image height Y'.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An image-taking lens system for forming an image on an imaging element, said lens system comprising from an object side:
    a first lens having a positive power;
    a cemented lens of a second lens having a negative power and a third lens having a positive power; and
    a fourth lens whose concave face is directed toward the image side and having a meniscus shape,
    wherein the following conditional expression is fulfilled, $|f/f23|<0.4$ where f: focal length of the entire system
      f23: total focal length of the second and third lenses.

2. An image-taking lens system according to claim 1, further comprising an aperture stop arranged in the object side of said first lens.

3. An image-taking lens system according to claim 1, wherein the following conditional expression is fulfilled, $|f/f4|<0.15$ (2)

where f4: focal length of the fourth lens.

4. An image-taking lens system according to claim 1, wherein the following conditional expression is fulfilled, $0.1<d7/f<0.4$ where d7: thickness on the axis of the fourth lens.

5. An image-taking lens system according to claim 1, wherein the image side surface of the fourth lens is aspherical.

6. An image-taking lens system according to claim 1, wherein the following conditional expression is fulfilled, $0.1<(r2+r3)/(r2-r3)<0.9$ where r2: radius of curvature on the object side surface of the first lens,
    r3: radius of curvature on the image side surface of the first lens.

7. An image taking apparatus comprising:
    imaging elements for converting an optical image to an electrical signal; and
    an image-taking lens system for forming an optical image of the object on a receiving surface of said imaging elements,
    said lens system including from the object side:
    a first lens having a positive power;
    a cemented lens of a second lens having a negative power and a third lens having a positive power; and
    a fourth lens whose concave face is directed toward the image side and having a meniscus shape,
    wherein the following conditional expression is fulfilled, $|f/f23|<0.4$ where f: focal length of the entire system
      f23: total focal length of the second and third lenses.

8. A digital apparatus comprising an imaging unit which includes imaging elements for converting an optical image to an electrical signal, and an image-taking lens system for forming an optical image of the object on a receiving surface of said imaging elements,
    said lens system including from an object side:
    a first lens having a positive power;
    a cemented lens of a second lens having a negative power and a third lens having a positive power; and
    a fourth lens whose concave face is directed toward the image side and having a meniscus shape,
    wherein the following conditional expression is fulfilled, $|f/f23|<0.4$ where f: focal length of the entire system
      f23: total focal length of the second and third lenses.

* * * * *